No. 737,678. Patented September 1, 1903.

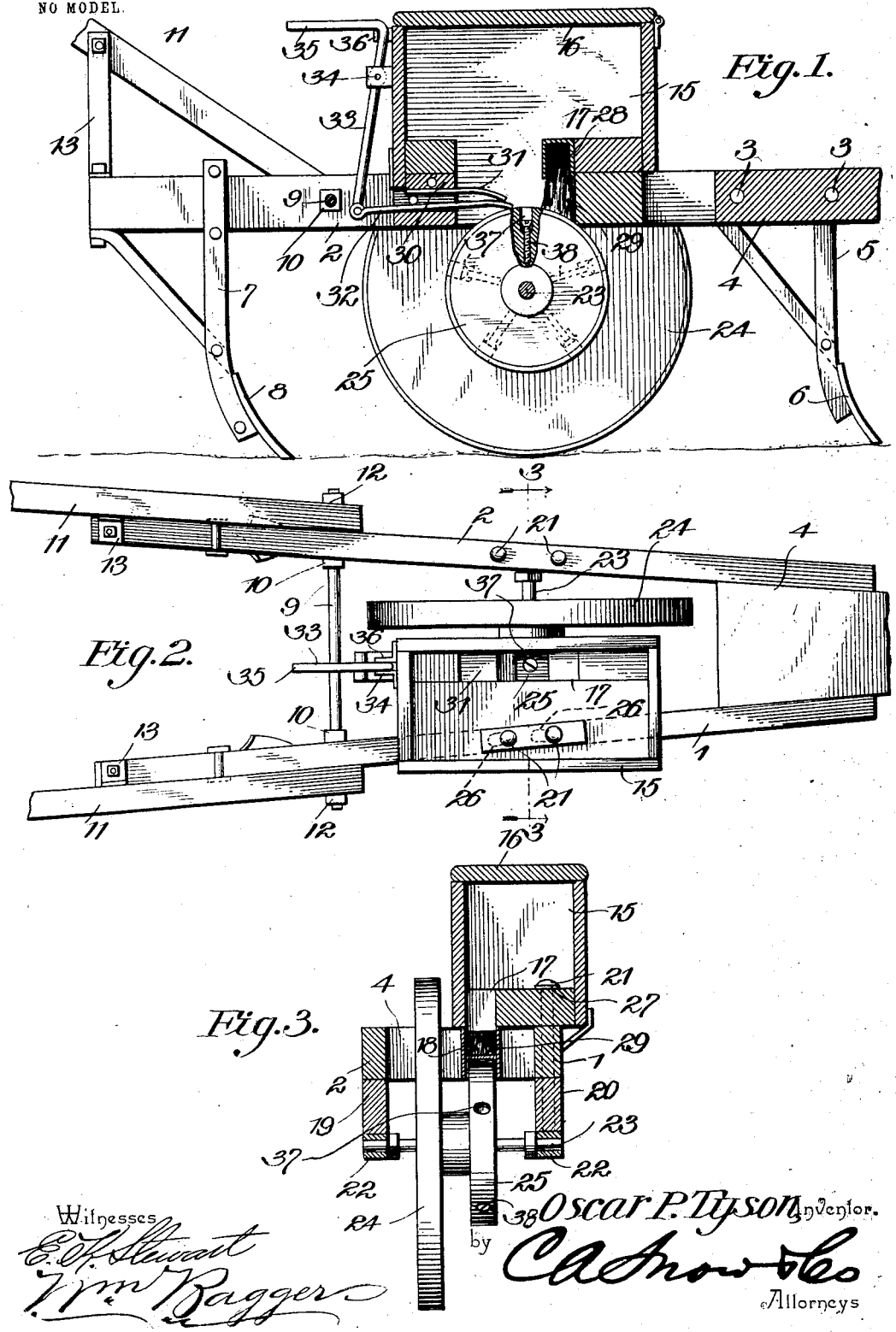

UNITED STATES PATENT OFFICE.

OSCAR PATEN TYSON, OF VILLA RICA, GEORGIA.

CORN-PLANTER.

SPECIFICATION forming part of Letters Patent No. 737,678, dated September 1, 1903.

Application filed July 1, 1903. Serial No. 163,937. (No model.)

*To all whom it may concern:*

Be it known that I, OSCAR PATEN TYSON, a citizen of the United States, residing at Villa Rica, in the county of Carroll and State of Georgia, have invented a new and useful Corn-Planter, of which the following is a specification.

This invention relates to corn-planters, and it has for its object to provide a device of this class which shall possess superior advantages in point of simplicity, durability, inexpensiveness, and general efficiency.

With these and other ends in view the invention consists in certain improvements in the construction, arrangement, and combination of the component parts of the device which will be hereinafter fully described, and particularly pointed out in the claims.

In the accompanying drawings, Figure 1 is a longitudinal sectional elevation of a corn-planter constructed in accordance with the principles of my invention. Fig. 2 is a top plan view. Fig. 3 is a transverse sectional view taken on the line 3 3 in Fig. 2.

Corresponding parts in the several figures are indicated by similar numerals of reference.

In the construction of my improved corn-planter I avail myself of a pair of side beams 1 2, converging forwardly and connected at their front ends by means of transverse bolts 3, passing through said side beams and through an intervening block 4, which latter, when desired, may be extended forwardly so as to form a tongue. When not thus extended, the draft appliance may be connected directly with said block.

The block 4 supports a standard 5, carrying a furrow-opener 6, and standards 7, carrying covering devices 8, are suitably connected with the beams 1 2 near the rear ends of the latter. The said beams are also suitably spaced apart at no great distance from their rear ends by means of a transverse brace 9, having screw-threaded ends which extend through the beams 1 and 2 and are provided with nuts 10, bearing against the inner sides of said beams to space the latter. The lower ends of the handles 11 are mounted upon the outer ends of the brace 9 and are secured upon said brace by means of nuts 12. Braces 13 of ordinary construction are employed to support the handles in a proper position with relation to the beams 1 and 2.

15 designates the seed box or hopper, which in this instance has been shown as being of a rectangular form and provided with a hinged cover 16. The hopper is provided in the bottom and at one side thereof with a longitudinal slot 17, at the sides of which are mounted downwardly-extending sheet-metal flanges 18. Brackets 19 and 20 are suitably secured upon the under sides of the beams 1 and 2 by means of vertical bolts 21. These brackets are provided with boxes or bearings 22 for the axle 23, carrying a traction-wheel 24 and the seed-wheel 25. The bolts 21, which serve to secure the bracket 20 to the under side of the beam 2, also extend upwardly through the bottom of the seed box or hopper, which is provided with slots 26 for the passage of said bolts. It will be observed that by loosening the nuts upon the latter the seed box is thus capable of being adjusted very nicely with relation to the seeding mechanism proper. Such a feature as a washer 27 introduced between the heads of the bolts and the bottom of the seed box is incidental to the mechanical construction of the device.

It will be observed that between the flanges 18, depending from the slot in the bottom of the hopper, is formed a groove or recess in the forward end of which is mounted a block 28, carrying a brush 29, which engages the periphery of the seed-wheel for the purpose of preventing a superfluity of seeds from entering the seed-cups and being deposited in the furrow. At the rear end of said groove is mounted another block, 30, having a forwardly and downwardly extending spring 31, the lower edge of which exercises pressure in a downward direction.

32 is a slide or cut-off engaging the periphery of the seed-wheel and extending under the spring 31, whereby it is retained in contact with the periphery of said seed-wheel and projecting rearwardly through an opening at the rear end of the hopper. The rear end of said cut-off is connected with the lower end of a hand-lever 33, fulcrumed at 34 and having at its upper end a handle 35, by means of which it may be conveniently manipulated. A catch 36, secured upon the rear side of the hopper, is adapted to engage and retain the handle end of the lever when the cut-off is withdrawn to an inoperative position.

The seed wheel or disk 25 is provided with a circumferential series of radial sockets or openings 37, in each of which is mounted a set-screw 38, the head of which may be set to form the bottom of the socket. It will be observed that the heads of these set-screws may be adjusted entirely flush with the rim of the seed-wheel, while by turning the screws they may be caused to enter the respective sockets or recesses, thus forming seed-cups of any desired capacity. It is also obvious that either a single one or any desired number of the said screws may be thus entered into the respective sockets, thus providing the seed-wheel with a single or with any desired plurality of seed-cups.

The operation of this device will be readily understood. When the machine progresses over the ground, the traction-wheel will follow in the wake of the furrow-opener, rotating the axle and the seed-wheel, which is mounted upon said axle. When the cut-off 32 is withdrawn to an inoperative position, the seeds contained in the box will enter into the cups of the seed-disk. The brush will remove superfluous seeds and prevent them from being carried around with the disk. As the latter rotates the seeds will be dropped into the furrow, where they are covered by means of the covering device to which reference has hereinbefore been made. In order to throw the seed-dropping device temporarily out of operation, the operating-lever may be manipulated so as to push the cut-off in a forward direction under the spring which holds it in contact with the periphery of the seed-wheel, when, access to the seed-cups being barred, the seeding operation is naturally and necessarily suspended.

I have in the foregoing described a simple and preferred construction of my improved corn-planter; but I desire it to be understood that I do not limit myself with regard to structural details, but reserve the right to any changes and modifications which may be resorted to within the scope of my invention and without departing from the spirit or sacrificing the utility of the same.

Having thus described my invention, I claim—

1. In a corn-planter, a supporting-frame having side beams, brackets depending from the side beams, a shaft journaled in boxes attached to said brackets, a traction-wheel and a seed-disk mounted upon said shaft, a hopper supported on the frame and having a slot provided with flanges depending at the sides of the seed-disk, a brush-bearing block mounted between the front ends of said flanges, a spring-bearing block mounted between the rear ends of said flanges, a cut-off movable between the spring and the periphery of the seed-disk, and operating means for said cut-off.

2. In a corn-planter, a hopper having a slot and flanges depending from the sides of said slot, a seed-disk mounted revolubly below said slot and extending between said flanges, said seed-disk being provided with radially-disposed seed-cups, a slidable cut-off engaging the periphery of said seed-disk, and a spring disposed to hold said cut-off normally in contact with the periphery of said seed-disk.

3. In a corn-planter, a supporting-frame having forwardly-converging side beams, a hopper supported adjustably upon one of said side beams and having a slot in the bottom thereof disposed between the side beams, flanges depending from said slot, an axle, a traction-wheel upon said axle, and a seed-disk upon said axle between the flanges depending from the seedbox, said seed-disk having radial sockets and wood-screws engaging the bottoms of said sockets to regulate the capacity of the seed-cups formed thereby.

In testimony that I claim the foregoing as my own I have hereto affixed my signature in the presence of two witnesses.

OSCAR PATEN TYSON.

Witnesses:
 J. M. MOORE,
 J. S. GAY.